United States Patent
Lecuyer et al.

(10) Patent No.: US 9,650,914 B2
(45) Date of Patent: May 16, 2017

(54) TURBINE BLADE FOR A GAS TURBINE ENGINE

(71) Applicant: Pratt & Whitney Canada Corp., Longueuil (CA)

(72) Inventors: Daniel J Lecuyer, St-Bruno (CA); Andrew Shapiro, Montreal (CA)

(73) Assignee: PRATT & WHITNEY CANADA CORP., Longueuil, QC (CA)

(*) Notice: Subject to any disclaimer, the term of this patent is extended or adjusted under 35 U.S.C. 154(b) by 424 days.

(21) Appl. No.: 14/193,073

(22) Filed: Feb. 28, 2014

(65) Prior Publication Data
US 2015/0247419 A1    Sep. 3, 2015

(51) Int. Cl.
*F01D 21/04* (2006.01)
*F01D 5/14* (2006.01)
*F01D 21/02* (2006.01)

(52) U.S. Cl.
CPC ............ *F01D 21/045* (2013.01); *F01D 5/141* (2013.01); *F01D 21/02* (2013.01); *F05D 2220/325* (2013.01)

(58) Field of Classification Search
CPC .......... F01D 5/141; F01D 5/145; F01D 5/147; F01D 11/122; F01D 11/127; F01D 21/045; F01D 21/12; F05D 2260/311; F04D 25/088; F04D 29/023; F04D 29/30; F04D 29/324; F04D 29/384; F04D 29/388
USPC .............. 416/2, 236 R, 243, 248, 500; 415/9
See application file for complete search history.

(56) References Cited

U.S. PATENT DOCUMENTS

| | | | | |
|---|---|---|---|---|
| 3,744,927 A | * | 7/1973 | Bernaerts | B63H 1/20 415/9 |
| 4,004,860 A | * | 1/1977 | Gee | B23P 15/02 415/9 |
| 4,720,239 A | * | 1/1988 | Owczarek | F01D 5/141 415/119 |
| 5,498,137 A | | 3/1996 | El-Aini et al. | |
| 6,042,338 A | * | 3/2000 | Brafford | F01D 5/10 29/889 |
| 6,358,012 B1 | | 3/2002 | Staubach | |
| 6,962,484 B2 | | 11/2005 | Brandl et al. | |
| 6,976,826 B2 | * | 12/2005 | Roy | F01D 5/141 416/1 |
| 7,118,346 B2 | * | 10/2006 | Read | F01D 5/16 416/229 A |

(Continued)

*Primary Examiner* — Matthew W Jellett
(74) *Attorney, Agent, or Firm* — Norton Rose Fulbright Canada LLP

(57) ABSTRACT

A turbine blade for a gas turbine engine comprises an airfoil having a pressure side, a suction side, a span direction and a chord-wise direction. The airfoil has an airfoil span on a pressure line being a projection of the stacking line onto the pressure side. The airfoil has a plurality of chords extending between a leading edge and a trailing edge of the airfoil. A generally round dimple is disposed on the pressure side. The dimple is contained in an area extending on the stacking line between 0% and 23% of the airfoil span from the inner end, and in the chord-wise direction between 0% of a first chord and 82% of a second chord from the leading edge. The dimple is configured to initiate fracture of the blade at a predetermined speed of rotation. A method of preventing rupture of a disk of a turbine rotor is also presented.

20 Claims, 4 Drawing Sheets

(56) References Cited

U.S. PATENT DOCUMENTS

| | | | |
|---|---|---|---|
| 7,794,197 B2 * | 9/2010 | Thompson | F01D 5/147 415/9 |
| 7,828,526 B2 * | 11/2010 | Cairo | F01D 5/147 416/224 |
| 7,946,827 B2 * | 5/2011 | Beckford | F01D 5/141 416/239 |
| 8,251,640 B2 * | 8/2012 | Beckford | F01D 21/04 415/9 |
| 8,403,645 B2 * | 3/2013 | Barnes | F01D 5/143 416/234 |
| 8,500,410 B2 * | 8/2013 | De Moura | F01D 5/16 416/229 A |
| 2009/0155082 A1 | 6/2009 | Duong et al. | |
| 2015/0247407 A1 * | 9/2015 | Lecuyer | F01D 5/141 416/223 A |

* cited by examiner

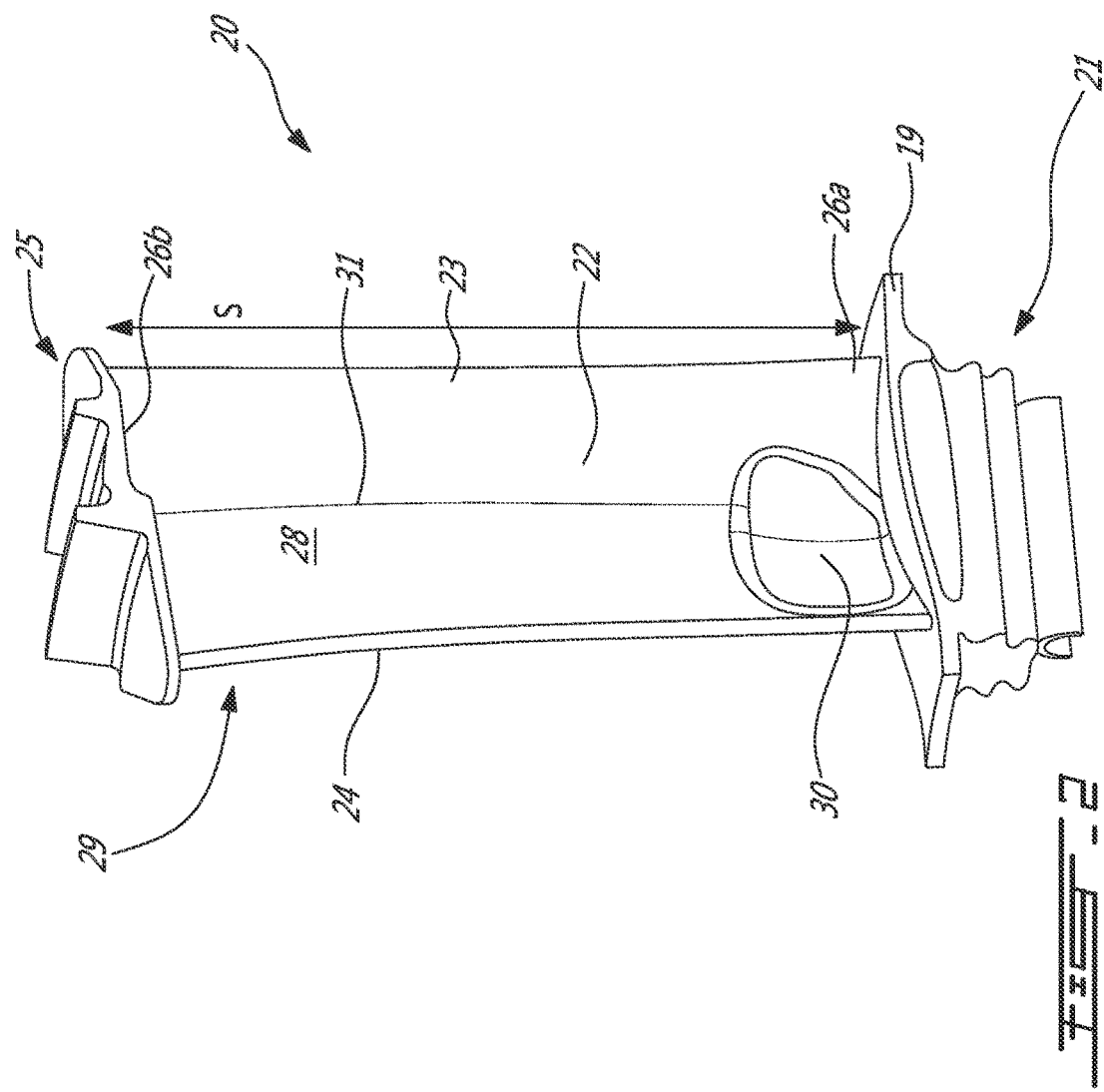

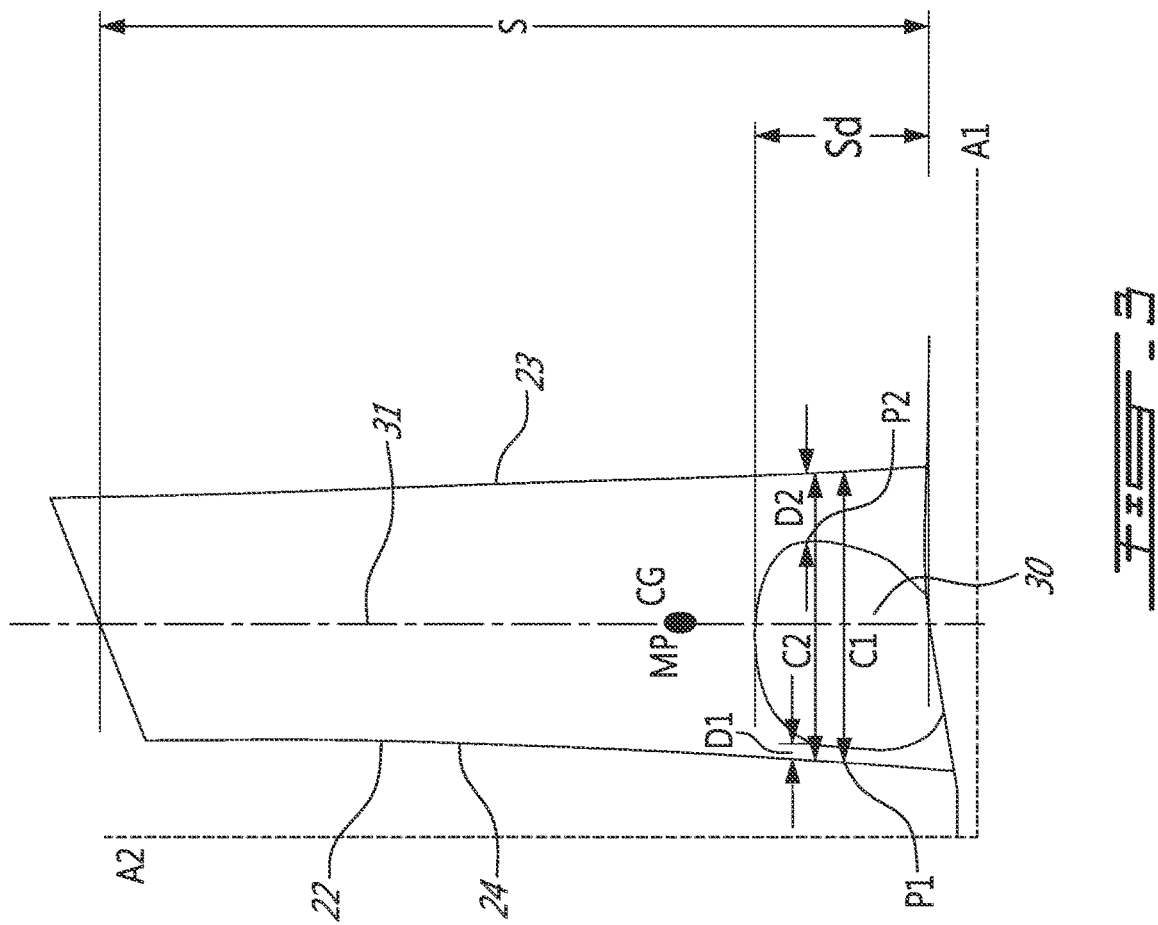

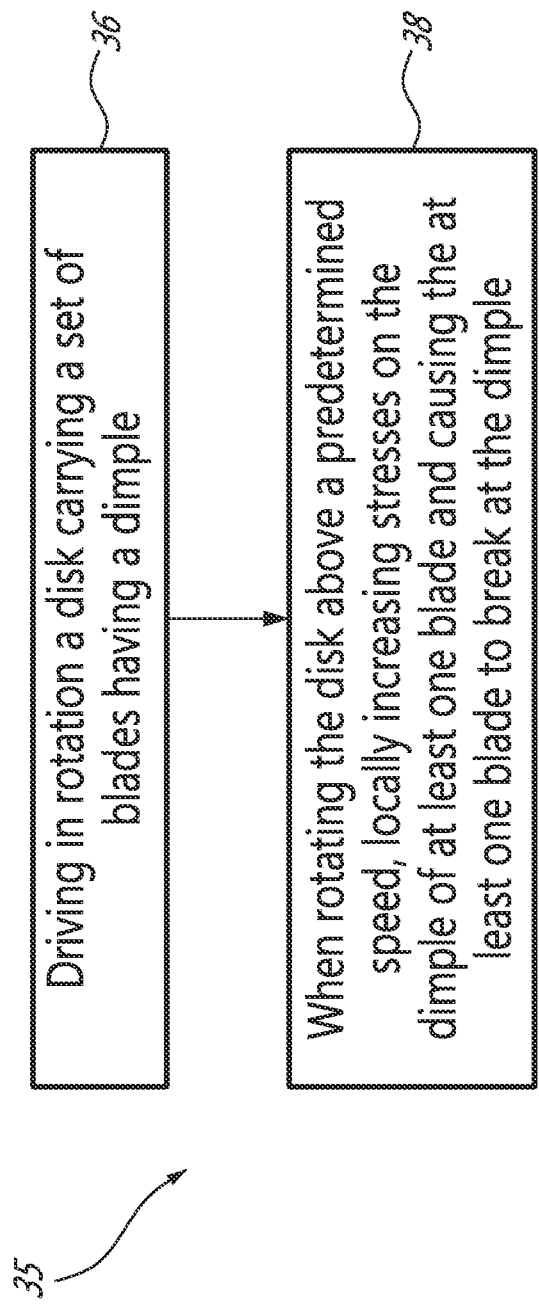

TURBINE BLADE FOR A GAS TURBINE ENGINE

TECHNICAL FIELD

The application relates generally to turbines for gas turbine engines and, more particularly, to turbine blades.

BACKGROUND OF THE ART

Turbine rotors in gas turbine engines comprise circumferentially-disposed turbine blades extending radially from a common disk. Each turbine blade has a root portion connected to the disk and an airfoil shaped portion extending radially into a gas path. In the event that the rotor becomes decoupled from the engine component that is extracting the torque from the rotor (e.g. shaft), rotor overspeed can occur. In such cases, the disk may rupture and cause damage to the gas turbine engine.

SUMMARY

In one aspect, there is provided a turbine blade for a gas turbine engine, the blade comprising: an airfoil having a pressure side and a suction side, the airfoil having a span direction and a chord-wise direction, the airfoil extending from an inner end to an outer end in the span direction and from a leading edge to a trailing edge in the chord-wise direction, the airfoil having an airfoil span on a pressure line being a projection of the stacking line onto the pressure side, the airfoil having a plurality of chords extending between the leading edge and the trailing edge; and a generally round dimple on the pressure side, the dimple being contained in an area extending on the stacking line between 0% and 23% of the airfoil span from the inner end, and in the chord-wise direction between 0% of a first chord and 82% of a second chord from the leading edge, the dimple being configured to initiate fracture of the blade at a predetermined speed of rotation.

In accordance with another aspect, there is provided a low stress turbine blade for a gas turbine engine, the low stress turbine blade comprising: an airfoil having a pressure side and a suction side, the airfoil extending radially from an inner end to an outer end; and a weaken area of reduced airfoil cross-section disposed on the pressure side adjacent to the leading edge and the inner end, the area configured to initiate fracture of the blade at a predetermined speed of rotation of the blade.

In accordance with another aspect, there is provided a method of preventing rupture of a disk of a turbine rotor, the method comprising: driving the disk in rotation, the disk carrying a set of circumferentially spaced-apart airfoil shaped blades, each of the blades having a generally round dimple disposed on a pressure side of the blade next to the disk, the dimple being contained in an area extending on a stacking line between 0% and 23% of an airfoil span on the stacking line from an inner end of the blade, and chordwise from the leading edge between 0% of a first chord and 82% of a second chord; and when rotating the disk above a predetermined speed, locally increasing stresses on the dimple of at least one blade and causing the at least one blade to break at the dimple, thereby preventing rupture of the disk.

DESCRIPTION OF THE DRAWINGS

Reference is now made to the accompanying figures in which:

FIG. 2 is an isometric view of a blade of a turbine of a gas turbine engine such as the one of FIG. 1;

FIG. 3 is a side view of the pressure side of the blade of FIG. 2; and

FIG. 4 is a flow chart of a method of preventing rupture of a disk holding the blades of FIG. 2.

DETAILED DESCRIPTION

Figure 1:
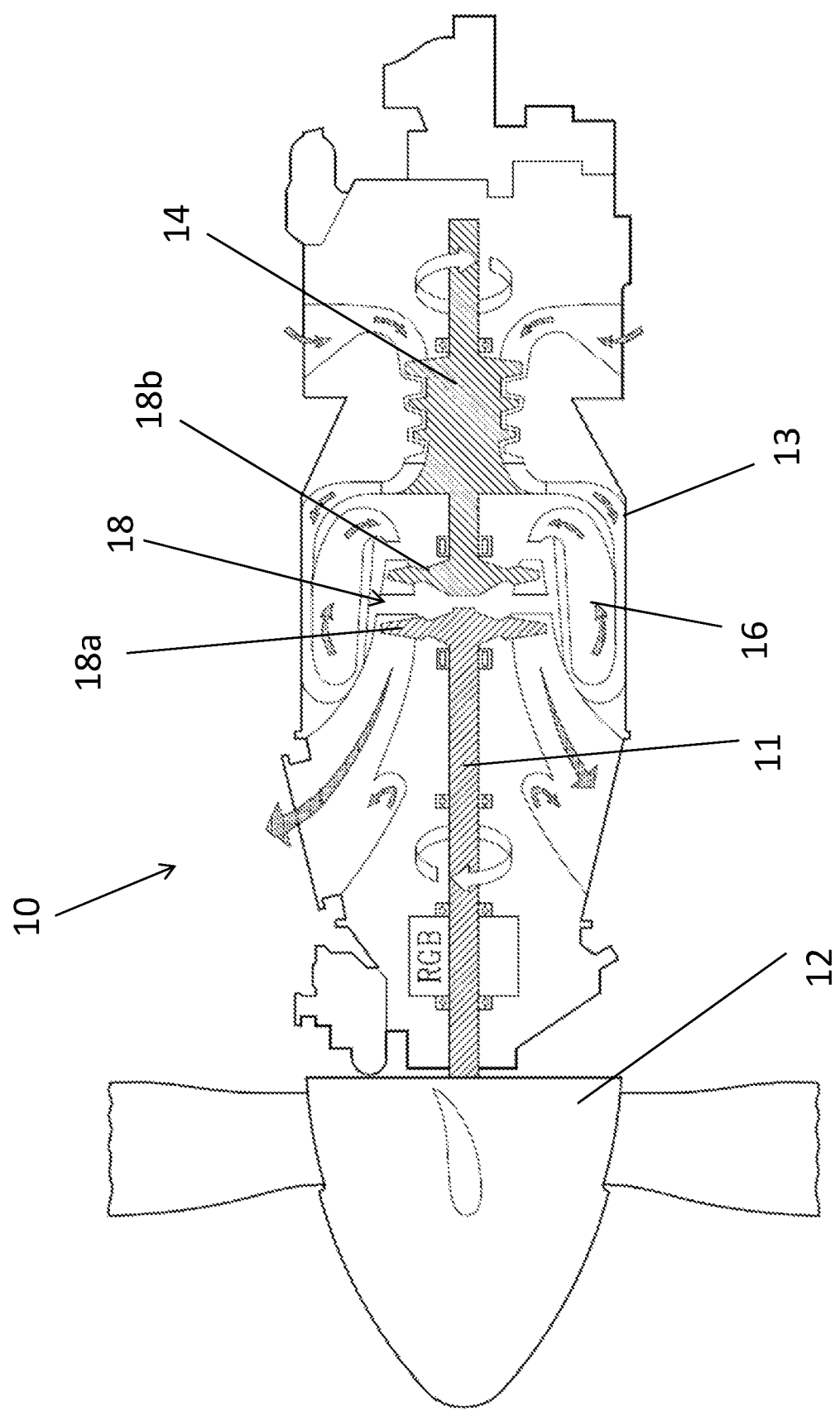
FIG. 1 is a schematic cross-sectional view of a gas turbine engine of a turbofan type.

FIG. 1 illustrates a gas turbine engine 10 of a type preferably provided for use in subsonic flight, generally comprising in serial flow communication within a casing 13 a propeller 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section comprises a power turbine 18a and a compressor turbine 18b. The power turbine 18a drives the propeller 12 via a low pressure shaft. The power turbine 18a may comprise a plurality of stages. Each stage comprises a set of circumferentially spaced-apart blades radiating from a disk mounted for rotation about a central axis 11 of the engine 10.

FIG. 2 illustrates a turbine blade 20 suited to form part of a first stage of the power turbine 18b. An example of blade 20 is found in U.S. patent application Ser. No. 14/192,984, entitled POWER TURBINE BLADE AIRFOIL PROFILE, filed on Feb. 28, 2014/same day as the present application, the content of which is incorporated herein by reference.

Each turbine blade 20 has a platform 19, a root portion 21 depending from the platform 19, an airfoil portion 22 extending radially outward from the platform 19. The airfoil portion 22 extends spanwise from an inner end 26a to a radially outer end or tip 26b. A shroud portion 25 may be provided at the tip 26b of the airfoil portion 22. The platform 19, the root portion 21, the airfoil portion 22 and the shroud portion 25 may be integrally casted and then machined to their final shape. It is understood that other suitable manufacturing methods could be used as well (e.g. metal injection molding).

The root portion 21 of each turbine blade 20 is received with correspondingly-shaped firtree slots in the disk of the turbine rotor. The root portion 21 shown in FIG. 3 is only one example of root portion 21 usable with the blade 20.

The shroud 25 is integrally formed with the airfoil portion 22 of the turbine blade 20, and covers and extends beyond the outer radial end 26b of the airfoil portion 22. It is contemplated that the shroud 25 could be welded to the airfoil portion 22. The shroud 25 reduces tip leakage loss of the airfoil portion of the blade. The shroud 25 shown in FIG. 2 is only one example of shroud for the blade 20. It is contemplated that the shroud 25 could be omitted.

The airfoil portion 22 of the turbine blade 20 extends into a gas path accommodating the annular stream of hot combustion gases generated by the combustor 16, the hot combustion gases acting on the airfoil portion 22 of the turbine blades 20 and causing the turbine rotor 20 to rotate. The airfoil portion 22 of the turbine blade 20 includes a leading edge 24 and a trailing edge 23, the trailing edge 23 being positioned further aft longitudinally than the leading edge 24. That is downstream from the leading edge 24 relative to the flow of gas through the turbine. The airfoil portion 22 of the turbine blade 20 is cambered (i.e. curved camber line) as is typical in the art of turbine blade airfoils. The airfoil portion 22 includes a pressure side 28 having a generally concave shape, and a suction side 29 located opposite the pressure side 28, the suction side 29 having a generally convex shape.

The airfoil portion 22 has a local reference system as shown in FIG. 3. The airfoil portion 22 has a chord-wise direction A1 parallel to the longitudinal central axis 11, and a span direction A2 perpendicular to the longitudinal central axis 11. The span direction A2 is also a radial direction. The airfoil portion 22 has an airfoil span S calculated on a pressure line 31 being a projection of the stacking line onto the pressure side 28. The stacking line may be the radial line going through a midpoint MP of the airfoil 22 in the span and chord-wise directions A1, A2. The stacking line may also be the line in the span direction A2 going through the center of gravity CG of the airfoil 22. In one embodiment, the airfoil span S is 2.189 inches.

Still referring to FIG. 3, a dimple or weak area 30 in the airfoil portion 22 will now be described. The dimple 30 is a concave portion (or depression) on the pressure side 28 of the airfoil 22 designed to cause a fracture of the blade 20 by increasing stresses on the blade 20 at a predetermined speed of rotation of the blade/disk. The predetermined speed corresponds to an abnormal speed of rotation. The dimple 30 is also designed to not cause a fracture of the blade 20 at any normal speed of rotation of the blade 20/disk. The dimple 30 is used on blades 20 found in the first stage of the power turbine 18a because the blades 20 in that first stage are low stress blades, i.e. they cannot by themselves fracture or fail at the predetermined speed. Low stress blades have typically a large cross-section which reduces their stresses as they rotate. The dimple 30 weakens these large cross-section blades 20 so as to fracture at the predetermined speed. The predetermined speed is related to a maximum allowed rotation speed of the rotor before rupture of the turbine disk. In one embodiment, the predetermined speed is typically at least 10% less than a speed that would cause fracture of the disk should the at least one blade 20 not have the dimple 30. The 10% difference is also known as a burst margin requirement of the blade 20. A break of a blade 20 can be more easily contained than a rupture of the disk. The dimple 30, as described below, could be disposed on any blades at any stage of the turbine which could not respect their burst margin requirement without the dimple 30.

The dimple 30 has a generally rounded irregular shape and is disposed toward the inner end 26a and the leading edge 24 adjacent to platform 19. The dimple 30 may be contained in an area extending on the stacking line between 0% and 23% of the airfoil span from the inner end 26a. In one embodiment, the dimple 30 extends on the pressure line 31 between 0% and 23% of the airfoil span S as determined from the airfoil's inner end 26a. In one embodiment, the dimple 30 extends on the pressure line 31 between 0% and 19% of the airfoil span S as determined from the airfoil's inner end 26a. In one embodiment, the dimple 30 extends on the pressure line 31 between 0% and 21% of the airfoil span S as determined from the airfoil's inner end 26a.

The dimple 30 may be contained in an area extending in the chord-wise direction between 0% of a first chord and 82% of a second chord from the leading edge 24. In one embodiment, in the chord-wise direction, a point P1 of the dimple 30 closest to the leading edge 24 is disposed at 5% from the leading edge 24 of a chord C1 going through that point P1. In one embodiment, a point P2 of the dimple 30 closest to the trailing edge 23 is disposed at 76% from the leading edge 24 of a chord C2 going through that point P2. In one embodiment, the point P1 is disposed at 0% from the leading edge 24 of the chord C1 going through that point P1. In one embodiment, the point P2 is disposed at 71% from the leading edge 24 of the chord C2 going through that point P2. In another embodiment, the point P1 is disposed at 9% from the leading edge 24 of the chord C1 going through that point P1. In one embodiment, the point P2 is disposed at 82% from the leading edge 24 of the chord C2 going through that point P2.

The dimple 30 is material removed from the airfoil 22 corresponding to a maximum of 39% of the un-dimpled nominal airfoil 22 thickness. In one embodiment, the dimple 30 is material removed from the airfoil 22 corresponding to 35% of the un-dimpled nominal airfoil 22 thickness. In another embodiment, the dimple 30 is material removed from the airfoil 22 corresponding to 31% of the un-dimpled nominal airfoil 22 thickness.

In one embodiment, a local area reduction achieved by the dimple 30 is 20%. In one embodiment, a local area reduction achieved by the dimple 30 is 23%. In one embodiment, a local area reduction achieved by the dimple 30 is 25%.

In one embodiment, a local stress increase achieved by the dimple 30 is 30%. In one embodiment, a local stress increase achieved by the dimple 30 is 25%. In one embodiment, a local stress increase achieved by the dimple 30 is 33%.

The dimple 30 may have a shape slightly different from the one shown in the Figures depending on the locations of chords C1 and C2 in the span direction A2. In one embodiment, the span Sd of the dimple 30 along the pressure line 31 is 0.458 inches. In one embodiment, a distance D1 on the chord C1 between the leading edge 24 and the point P1 of the dimple 30 is 0.037 inches. In one embodiment, a distance D2 on the chord C2 between the trailing edge 23 and the point P2 of the dimple 30 is 0.18 inches. In one embodiment, a deepest point of the dimple 30 is at 0.044 inches from the pressure surface 28 of the airfoil 22.

Turning now to FIG. 4, a method 35 of preventing rupture of the turbine disk will be described.

The method 35 starts at step 36 with rotatingly driving the disk, the disk carrying a set of blades 20 having the dimple 30.

From step 36, the method 35 goes to step 38 where when rotating the blades 20 above the predetermined speed, stresses locally increases on the dimple 30 of at least one of the blades 20 on the disk and cause the at least one blade 20 to break at the dimple 30. As mentioned above, the predetermined speed is related to the maximum allowed rotation speed of the rotor before rupture of the turbine disk. By having the dimple 30 break at the predetermined speed, the disk is prevented from rupturing. The dimple 30 is designed to ensure the one or more blades 20 break at a repeatable, predictable location, which is approximately in the middle or just below the middle of the dimple 30 in the span direction A2. This location corresponds to a location where the average stress is at a maximum. At the same time, the dimple 30 is also designed to not cause a fracture of the at least one blade 20 at any normal rotation speed.

The above description is meant to be exemplary only, and one skilled in the art will recognize that changes may be made to the embodiments described without departing from the scope of the invention disclosed. Although the blade with the dimple has been shown herein for use in a turbine blade for a turboprop engine, it is contemplated that the blade with the dimple could be used in a turbofan, turboshaft, auxiliary power unit or industrial gas turbine, and maybe also be used on compressor blades. Still other modifications which fall within the scope of the present invention will be apparent to those skilled in the art, in light of a review of this disclosure, and such modifications are intended to fall within the appended claims.

The invention claimed is:

1. A turbine rotor for a gas turbine engine, the turbine rotor comprising:
   a turbine disk having a rupture rotational speed at which the turbine disk ruptures;
   a plurality of blades receivable in the turbine disk each having an airfoil, the airfoil having a pressure side and a suction side, the airfoil having a span direction and a chord-wise direction, the airfoil extending from an inner end to an outer end in the span direction and from a leading edge to a trailing edge in the chord-wise direction, the airfoil having an airfoil span on a pressure line being a projection of a stacking line onto the pressure side, the airfoil having a plurality of chords extending between the leading edge and the trailing edge; and
   a generally round dimple on the pressure side of the airfoil, the dimple being contained in an area extending on the stacking line between 0% and 23% of the airfoil span from the inner end, and in the chord-wise direction between 0% of a first chord and 82% of a second chord from the leading edge, the dimple corresponding to material removed from the airfoil, the material removed being greater than 15% and up to a maximum of 39% of un-dimpled nominal airfoil thickness of the airfoil, the dimple being configured to initiate fracture at the dimple of each one of the plurality of blades at a predetermined rotational speed being less than the rupture rotational speed of the turbine disk.

2. The turbine rotor as defined in claim 1, wherein the dimple is configured to cause the corresponding blade to fracture at an abnormal predetermined speed of rotation, and wherein the corresponding blade is a low stress blade that would not by itself fracture at the abnormal predetermined speed of rotation.

3. The turbine rotor as defined in claim 2, wherein the abnormal predetermined speed of rotation is determined as a function of a maximum allowed rotation speed of the turbine disk.

4. The turbine rotor as defined in claim 1, wherein the predetermined rotational speed is about 10% less than the rupture rotational speed of the turbine disk.

5. The turbine rotor as defined in claim 2, wherein the corresponding blade is a power turbine blade of a first stage power turbine rotor.

6. The turbine rotor as defined in claim 1, wherein the first chord and the second chord are distinct from each other.

7. The turbine rotor as defined in claim 1, wherein the dimple extends on the stacking line between 0% and 21% of the airfoil span from the inner end.

8. The turbine rotor as defined in claim 1, wherein the dimple extends on the stacking line between 0% and 19% of the airfoil span from the inner end.

9. The turbine rotor as defined in claim 1, wherein the dimple extends in the chord-wise direction between 0% of the first chord and 71% of the second chord from the leading edge.

10. The turbine rotor as defined in claim 1, wherein the dimple extends in the chord-wise direction from 5% of the first chord to 76% of the second chord from the leading edge.

11. The turbine rotor as defined in claim 1, wherein the dimple extends in the chord-wise direction from 9% of the first chord to 82% of the second chord from the leading edge.

12. The turbine rotor as defined in claim 1, wherein the dimple corresponds to material removed from the airfoil corresponding up to 35% of the un-dimpled nominal airfoil thickness.

13. A low stress turbine blade for a gas turbine engine, the low stress turbine blade comprising:
    a root portion adapted to be received in a turbine disk of the gas turbine engine, the turbine disk having a rupture rotational speed at which the turbine disk ruptures;
    an airfoil extending from the root portion having a pressure side and a suction side, the airfoil extending radially from an inner end to an outer end thereof along a span of the airfoil; and
    a weakened area of reduced airfoil cross-section disposed on the pressure side adjacent to a leading edge of the airfoil and the inner end, the weakened area extending on a blade pressure line from 0% up to 23% of the span from the inner end, the weakened area extending in a chord-wise direction from 5% of a first chord up to 82% of a second chord from the leading edge, the weakened area configured to initiate fracture at the weakened area of the blade at a predetermined rotational speed being less than the rupture rotational speed of the turbine disk.

14. The low stress turbine blade as defined in claim 13, wherein the weakened area comprises a generally round dimple on the pressure side of the blade.

15. The low stress turbine blade as defined in claim 13, wherein the weakened area comprises a dimple, the dimple having a maximum thickness of 39% of a local thickness of the airfoil and a minimum thickness greater than 15% of the local thickness of the airfoil.

16. The low stress turbine blade as defined in claim 13, wherein the blade has a 10% burst margin.

17. The low stress turbine blade as defined in claim 13, wherein the blade is a power turbine blade of a first stage power turbine rotor.

18. A method of preventing rupture of a turbine disk of a turbine rotor, the turbine disk having a rupture rotational speed at which the turbine disk ruptures, the method comprising:
    driving the disk in rotation, the disk carrying a set of circumferentially spaced-apart airfoil shaped blades, each of the blades having a generally round dimple disposed on a pressure side of the blade next to the disk, the dimple being contained in an area extending on a stacking line from 0% up to 23% of an airfoil span on the stacking line from an inner end of the blade, and chord-wise from the leading edge from 5% of a first chord up to 82% of a second chord; and
    when rotating the disk above a predetermined rotational speed being less than the rupture rotational speed, locally increasing stresses on the dimple of at least one blade and causing the at least one blade to break at the dimple, thereby preventing rupture of the disk.

19. The method as defined in claim 18, wherein driving the turbine disk in rotation further comprises driving in rotation the plurality of blades with the dimple having a maximum thickness of 39% of a local thickness of the airfoil and a minimum thickness greater than 15% of the local thickness of the airfoil.

20. The method as defined in claim 18, wherein the predetermined rotational speed is about 10% less than the rupture rotational speed.

* * * * *